(12) United States Patent
Banowetz et al.

(10) Patent No.: US 8,657,296 B1
(45) Date of Patent: Feb. 25, 2014

(54) RADIAL SHAFT SEAL (71) Applicant: Engineered Seal Products, Inc., Cedar Rapids, IA (US)

(72) Inventors: Matthew Banowetz, Cedar Rapids, IA (US); Mark J. Reimer, Coralville, IA (US)

(73) Assignee: Engineered Seal Products, Inc., Cedar Rapids, IA (US)

( * ) Notice: Subject to any disclaimer, the term of this patent is extended or adjusted under 35 U.S.C. 154(b) by 30 days.

(21) Appl. No.: 13/942,237

(22) Filed: Jul. 15, 2013

Related U.S. Application Data (63) Continuation of application No. 13/658,528, filed on Oct. 23, 2012.

(60) Provisional application No. 61/551,474, filed on Oct. 26, 2011.

(51) Int. Cl.
*F16J 9/00* (2006.01)
*F16J 15/447* (2006.01)

(52) U.S. Cl.
USPC .......................... 277/345; 277/412; 277/415

(58) Field of Classification Search
USPC .......................... 277/353, 347, 551, 571, 572
See application file for complete search history.

(56) References Cited

U.S. PATENT DOCUMENTS

| | | |
|---|---|---|
| 3,510,138 A | 5/1970 | Bowen et al. |
| 3,561,770 A | 2/1971 | Corsi et al. |
| 4,166,627 A | 9/1979 | Bainard et al. |
| 4,252,329 A | 2/1981 | Messenger |
| 4,460,185 A | 7/1984 | Grandey |
| 4,578,856 A | 4/1986 | Butler |
| 4,613,143 A | 9/1986 | Butler |
| 4,659,240 A | 4/1987 | Rogus |
| 4,696,479 A | 9/1987 | Karcher |
| 4,709,930 A | 12/1987 | Forch |
| 4,817,966 A | 4/1989 | Borowski |
| 5,004,248 A | 4/1991 | Messenger et al. |
| 5,013,052 A | 5/1991 | Butler et al. |
| 5,042,822 A | 8/1991 | Dreschmann et al. |
| 5,096,207 A | 3/1992 | Seeh et al. |
| 5,186,472 A | 2/1993 | Romero et al. |
| 5,201,528 A | 4/1993 | Upper |
| 5,213,343 A | 5/1993 | White, Jr. |
| 5,398,942 A | 3/1995 | Duckwall et al. |
| 5,522,600 A | 6/1996 | Duckwall |
| 5,553,866 A | 9/1996 | Heinzen |
| 5,611,548 A | 3/1997 | Dahlhaus |
| 5,645,283 A | 7/1997 | Drucktenhengst et al. |
| 5,720,486 A | 2/1998 | Hutchings et al. |
| 5,975,538 A | 11/1999 | Krause et al. |

(Continued)

OTHER PUBLICATIONS

Parker Hannifin Corporation, Rotary Seal Design Guide Catalog EPS 5350/USA, 2006.

*Primary Examiner* — Vishal Patel
*Assistant Examiner* — L. Susmitha Koneru
(74) *Attorney, Agent, or Firm* — Jason R. Sytsma; Shuttleworth & Ingersoll, PLC (57) ABSTRACT

A radial shaft seal for a radial shaft is formed with a casing having an exterior-facing surface opposite from an interior-facing surface, and a sleeve positioned radially inwardly of the casing that rotates with respect to the casing. A sealing ring is connected to the casing, and has an extending portion that interacts with the sleeve to form a labyrinth seal barrier.

16 Claims, 7 Drawing Sheets

(56) References Cited

U.S. PATENT DOCUMENTS

| | | |
|---|---|---|
| 6,027,121 A * | 2/2000 | Cromer et al. .................. 277/347 |
| 6,045,134 A * | 4/2000 | Turnquist et al. ............. 277/347 |
| 6,050,571 A | 4/2000 | Rieder et al. |
| 6,062,734 A | 5/2000 | Bundgart |
| 6,170,833 B1 | 1/2001 | Cox et al. |
| 6,173,961 B1 | 1/2001 | Martin |
| 6,257,587 B1 | 7/2001 | Toth et al. |
| 6,315,296 B1 | 11/2001 | Oldenburg |
| 6,406,026 B1 | 6/2002 | Oldenburg |
| 6,474,653 B1 | 11/2002 | Hintenlang et al. |
| 6,666,459 B1 | 12/2003 | Hufnagel |
| 7,594,664 B2 | 9/2009 | Maskaliunas |
| 7,648,144 B2 | 1/2010 | Sanada |
| 7,658,386 B2 | 2/2010 | Oldenburg |
| 7,926,814 B2 | 4/2011 | Foti |
| 7,950,670 B2 | 5/2011 | Maskaliunas |
| 8,240,440 B2 | 8/2012 | Massmann et al. |
| 2005/0241472 A1 | 11/2005 | Yatsko et al. |
| 2006/0157940 A1 | 7/2006 | Barbera et al. |
| 2007/0132193 A1 * | 6/2007 | Wolfe et al. .................. 277/415 |
| 2007/0158917 A1 | 7/2007 | Paykin |
| 2007/0187902 A1 | 8/2007 | Kurosawa |
| 2007/0205562 A1 | 9/2007 | Chien |
| 2007/0290451 A1 | 12/2007 | Yager |
| 2008/0054572 A1 | 3/2008 | Maskaliounas |
| 2011/0169226 A1 | 7/2011 | Ajiki et al. |
| 2012/0068416 A1 | 3/2012 | Greca et al. |
| 2012/0099986 A1 | 4/2012 | Hisada et al. |
| 2012/0326396 A1 | 12/2012 | Ajiki et al. |

\* cited by examiner

RADIAL SHAFT SEAL

This application claims priority to U.S. provisional patent application No. 61/551,474, filed on Oct. 26, 2011 and to U.S. patent application Ser. No. 13/658,528 filed on Oct. 23, 2012, the both of which are hereby incorporated herein by reference.

BACKGROUND OF THE INVENTION

The present invention relates to a radial shaft seal, and more specifically to a radial shaft seal having a labyrinth seal.

There are various types of radial shaft seals with multiple lips to keep environmental debris out of the sealed interior area. The lips are stationary and are compressed, so that they exert radial pressure against the surface of the rotating shaft. Over time, debris abrades the lip causing it to wear, and eventually lose its sealing property. Once this occurs, debris enters the seal where it eventually abrades the primary sealing lip, which is the last barrier to an interior area.

One way to extend the life of a radial shaft seal is to increase the number of lips between the environment and the sealed area. This, however, only delays the amount of time before the seal ultimately breaks down. Thus, a need exists for an improved positive seal that lasts longer and holds up better than merely increasing the number of lips.

SUMMARY OF THE INVENTION

A radial shaft seal for a radial shaft is formed with a casing having an exterior-facing surface opposite from an interior-facing surface, and a sleeve positioned radially inwardly of the casing that rotates with respect to the casing. A sealing ring is connected to the casing, and has an extending portion that interacts with the sleeve to form a labyrinth seal barrier.

In another embodiment, a radial shaft seal for a radial shaft has a casing with an exterior-facing surface opposite from an interior-facing surface, and a sleeve that is positioned radially inwardly of the casing that rotates with respect to the casing. A sealing ring is connected to the sleeve and has an extending portion that interacts with the casing to form a labyrinth seal barrier.

In another embodiment, a radial shaft seal for a radial shaft has a casing with an exterior-facing surface opposite from an interior-facing surface, and a sleeve that is positioned radially inwardly of the casing that rotates with respect to the housing. A sealing ring is connected to the sleeve and has an extending portion that interacts with the housing to form a labyrinth seal barrier.

In yet another embodiment, a method of forming a labyrinth seal in a radial shaft seal is provided. The radial shaft seal comprises a casing having an exterior-facing surface opposite from an interior-facing surface, a sleeve positioned radially inwardly of the casing that rotates with respect to the casing, a sealing ring connected to at least one chosen from the casing or the sleeve, and the sealing ring having an extending portion interacting with at least one chose from the casing, the housing, or the sleeve.

The radial shaft seal is positioned in a bore, and the radial shaft is press-fitted into the sleeve so that the sleeve rotates with the radial shaft. The sleeve is rotated with the radial shaft, and a groove is cut into or forms a labyrinth path by interacting with corresponding structure on, at least one chosen from the casing, the housing, or the sleeve with the extending portion as the radial shaft rotates, and thereby forming the labyrinth seal between the exterior-facing surface and the interior-facing surface.

DESCRIPTION OF THE ILLUSTRATED EMBODIMENT

Figure 1:
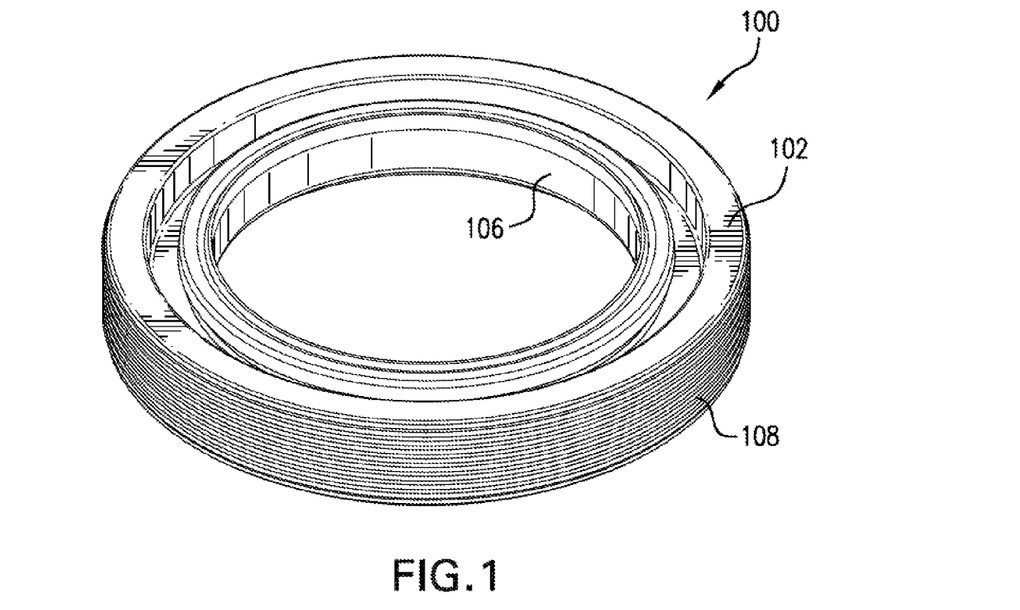
FIG. 1 is a perspective view of a radial shaft seal shown from the interior-facing side in accordance with the present invention.
Figure 2:
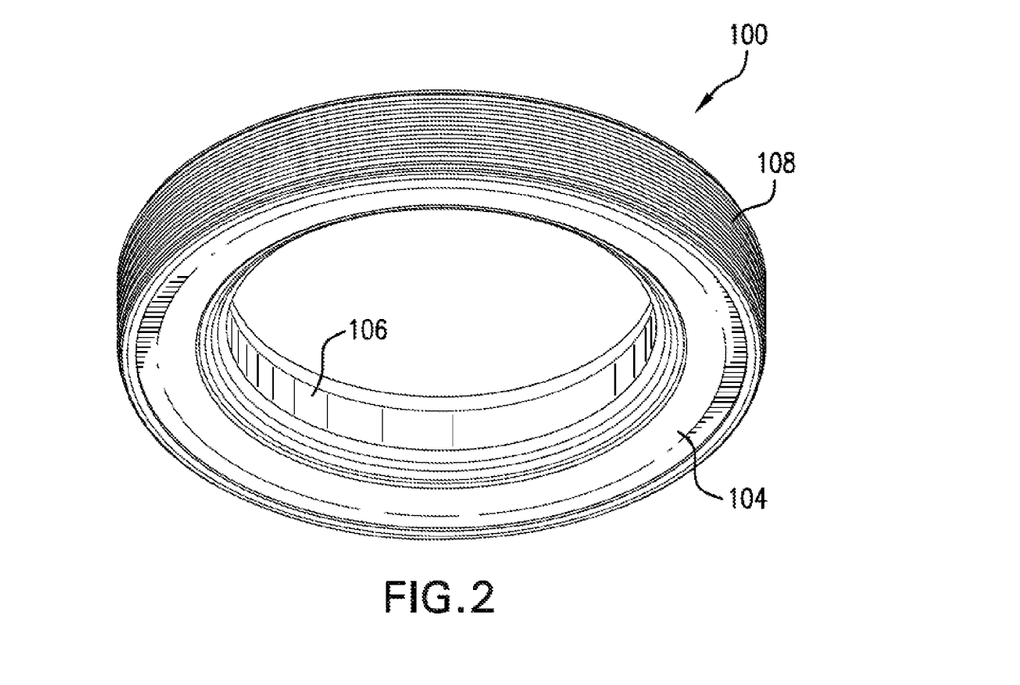
FIG. 2 is a perspective view of the radial shaft seal of FIG. 1 shown from the exterior-facing side
Figure 3:
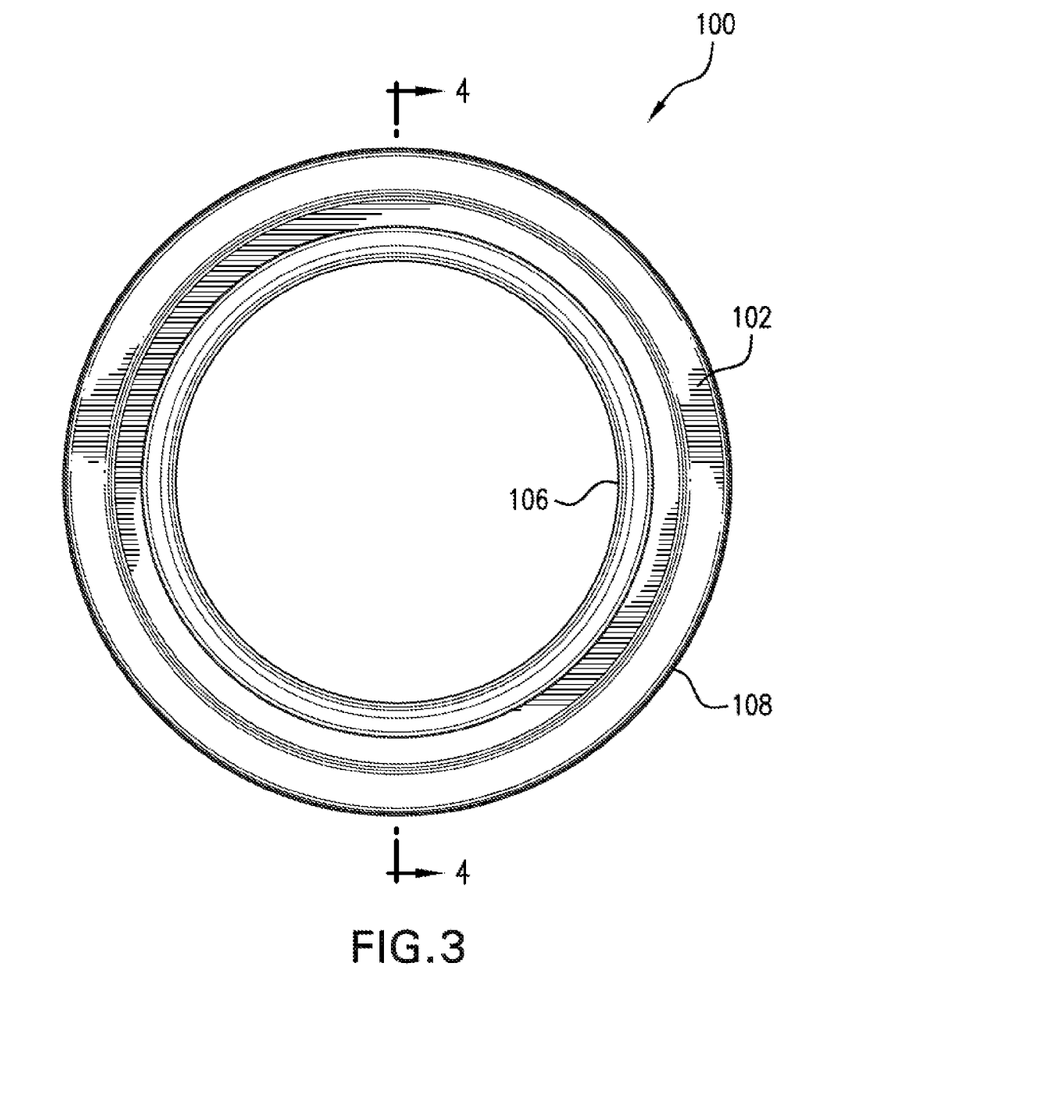
FIG. 3 is a front view of the radial shaft seal of FIG. 1 shown from the interior-facing side.

FIGS. 1 and 2 show a radial shaft seal 100 embodying the invention. Radial shaft seal 100 has a casing 108 bounded by an interior-facing surface 102, an exterior-facing surface 104, and a sleeve 106. Once installed, radial shaft seal 100 includes three primary sealing surfaces. The first sealing surface is a tight static seal formed from an interference fit between an outer diameter of casing 108 of radial shaft seal 100, covered in a resilient elastomeric material, and the housing bore. The outer diameter of casing 108 of radial shaft seal 100 is slightly larger than the bore to ensure a tight press fit that prevents leakage around casing 108, which also keeps radial shaft seal 100 retained in the bore.

The second sealing surface is formed between sleeve 106 and the radial shaft. The second sealing surface is a tight static seal formed from an interference fit between the inner diameter of sleeve 106 and the radial shaft. The inner diameter of sleeve 106 is slightly smaller than the radial shaft to ensure a tight press fit that prevents leakage around sleeve 106. Sleeve 106 then rotates with the radial shaft and with respect to the remaining portions of radial shaft seal 100. Sleeve 106 can also be engaged with the shaft via an adhesive, bonding material or other engaging mechanism.

Figure 4:
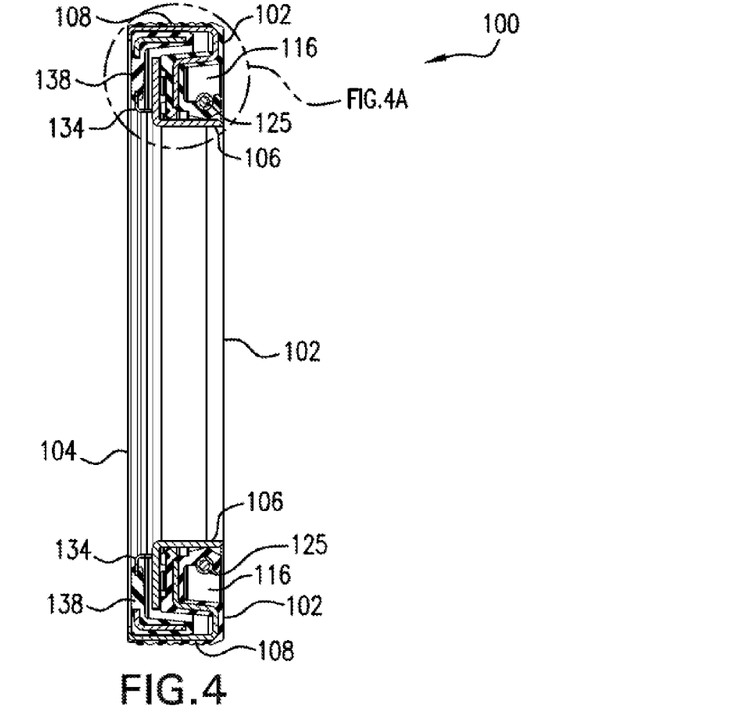
FIG. 4 is a cross-section of the radial shaft seal taken on line 4-4 of FIG. 3 illustrating the primary and secondary sealing lips and the labyrinth seal before it is formed.
Figure 4A:
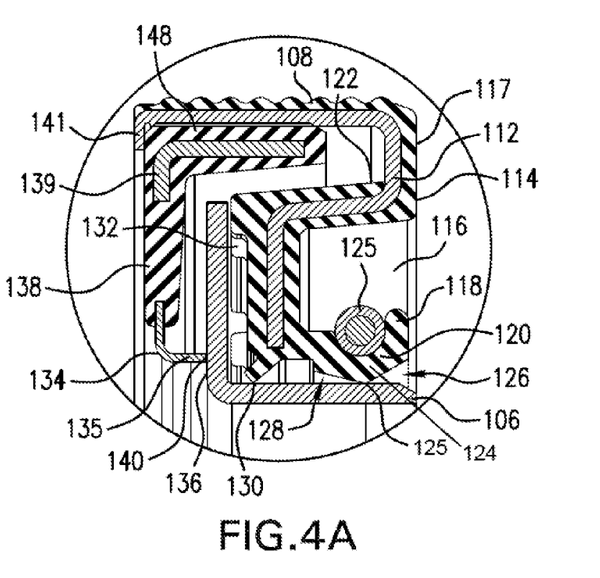
FIG. 4A is an enlarged view of the radial shaft seal from FIG. 4.

The third sealing surface is a dynamic sealing surface between one or more elastomeric lips and a labyrinth seal against sleeve 106. FIGS. 4 and 4A show sectional views of the inside of radial shaft seal 100, and specifically the third sealing surface.

Casing 108 of radial shaft seal 100 is formed from a metal flange 112 having an elastomer coating, which forms the outer diameter of casing 108 and a portion 117 of interior-facing surface 102 that is perpendicular to the outer diameter of casing 108. At the bottom of portion 117, the flange 112 extends inward toward exterior-facing surface 104 and down toward the inner diameter of radial shaft seal 100. The elastomer coating then extends back outward from the flange 112 toward interior-facing surface 102 to form primary sealing lip 124 and, with flange 112, recess 116. A spring-receiving recess 120 with an upward facing lip 118 is formed on the radially outer side of primary sealing lip 124.

An inner surface 122 of flange 112 begins generally at upward facing lip 118, and angles down toward the inner diameter of radial shaft seal 100. The primary sealing lip 124 has a radially inwardly facing surface having a high angle area 126 at about a forty-five degree angle and a low angle area 128 at about a thirty degree angle to form a primary sealing contact line 125 (the respective angles can be plus or minus three degrees or with any range therebetween). The steeper angle in high-angle area 126 creates a greater pressure gradient on the exterior-facing side 104 of radial shaft seal 100 that keeps lubricant from leaking around primary sealing lip 124. Primary sealing lip 124 is urged against sleeve 106 by a spring 125 positioned in spring-receiving recess 120.

Past primary sealing lip 124 on inner surface 122 of flange 112 is a secondary dust lip 130. Secondary dust lip 130 is a further barrier against environmental debris entering the interior-facing surface 102 of radial shaft seal 100. Only a single secondary dust lip 130 is shown in this illustrated embodiment, but multiple dust lips can be provided.

The inner elastomeric portion of flange 112 extends upward toward the outer diameter of radial shaft seal 100 forming a path 132 between inner surface 122 of the elastomeric shell of flange 112 and sleeve 106. The distance between inner surface 122 of the elastomeric shell of flange 112 and sleeve 106 is kept as minimal as possible to keep debris out, but large enough to prevent inner surface 122 from rubbing against sleeve 106, which would interfere with the rotation of the radial shaft by creating friction against the rotation of sleeve 106. Additionally, the area between sleeve 106 and flange 112 can be packed with grease or some other lubricant to keep moisture and debris out of path 132.

The entrance to path 132 is blocked by a labyrinth seal formed by a sealing ring 134 interacting with sleeve 106. Sealing ring 134 is connected to casing 108 at one end, and at the other end has an extending portion 135 having a cutting edge 140. Sealing ring 134 can be made from hardened steel or any other material suitable for cutting or can be coated with a cutting material, and held in its position by a resilient elastomeric biasing element 138, which urges sealing ring 136 into outer surface 136 of sleeve 106. In this regard, sealing ring 134 is pre-loaded against sleeve 106 when it is initially constructed. When the radial shaft and sleeve 106 begin to rotate, the preloaded hardened steel sealing ring 134 begins to cut/wear a groove 137 into sleeve 106 (see FIG. 5A), with the groove 137 generally forming to a size of the cutting edge 140 on extending portion 135 of sealing ring 134, thereby forming a labyrinth seal between the two components. As sealing ring 134 gradually cuts into sleeve 106, the preload on the cutting edge 140 is gradually diminished, until at a predetermined equilibrium, cutting edge 140 no longer actively cuts into sleeve 106.

The labyrinth seal is formed automatically and inexpensively by the cutting action of cutting edge 140 on sleeve 106. In one embodiment, cutting edge 140 is made from a material harder than the material that sleeve 106 is made from, to increase the cutting action of cutting edge 140 into sleeve 106, in one embodiment, cutting edge 140 is made from stainless steel, and sleeve 106 is made from carbon steel. Accordingly, a generally perfect fit of groove 137 to cutting edge 140 is obtained simply and without resort to costly precision machining of these parts. Cutting edge 140 is selected to be harder than the surface of sleeve 106 to form groove 137, and once groove 137 is formed, the predetermined equilibrium prevents further rotation of the radial shaft and sleeve 106 from producing further cutting/wear of either component and or significant degradation in the effectiveness of the labyrinth seal. Alternatively, the cutting edge can be provided with a coating or removable portion having a hardened and/or abrasive surface.

Biasing element 138 is formed from an elastomer material bonded around an inner rigid ring 139 for additional structural support. Biasing element 138 has a lateral portion 148 and a longitudinal portion 150 that extends down from lateral portion 148 at an angle of approximately eighty degrees, plus or minus 10 degrees or any range therebetween, when in a relaxed, unbiased condition. FIG. 5A shows longitudinal portion 150 at its equilibrium position at about an eighty degree angle from lateral portion 148 with cutting edge 140 positioned inside groove 137. FIG. 4A shows longitudinal portion 150 at about a ninety degree angle with respect to lateral portion 148 with cutting edge 140 flush against sleeve 106. The position shown in FIG. 4A is the pre-loaded position of sealing ring 134.

Biasing element 138 is held in position by a crimped portion 141 of the metal portion of flange 112, which crimped portion also strengthens and provides structural support for casing 108. Lateral portion 148 is positioned within an inner diameter of the casing 108, and the crimped portion 141 is crimped down against longitudinal portion 150 to combine casing 108 and flange 112 with biasing element 138.

Only a single labyrinth seal is shown in this illustrated embodiment, but multiple labyrinth seals can be provided as desired within the scope of this disclosure by providing additional cutting rings. Path 132 may be filled with grease to further enhance the seal, and to reduce heat and inhibit sparking between the metals during the initial phase while the labyrinth seal is being formed.

Figure 5:
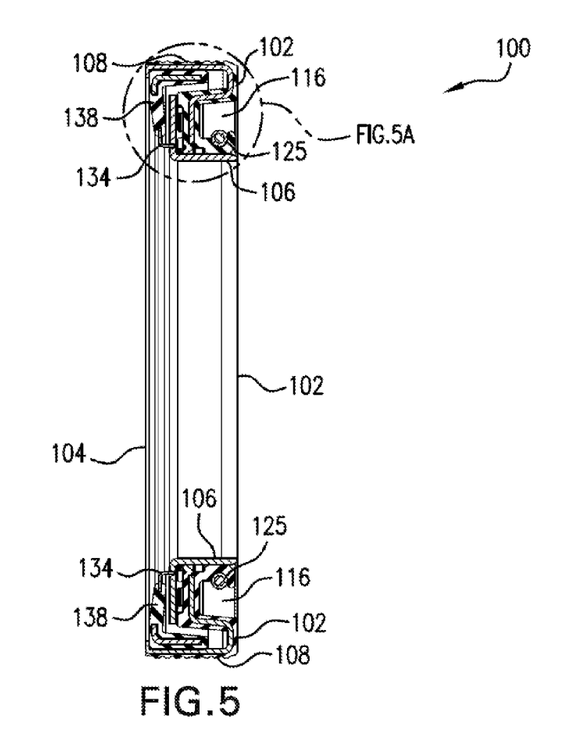
FIG. 5 is a cross-section of the radial shaft seal taken on line 4-4 of FIG. 3, but illustrating the primary and secondary sealing lips after they have been worn, and the labyrinth seal after it has been formed.
Figure 5A:
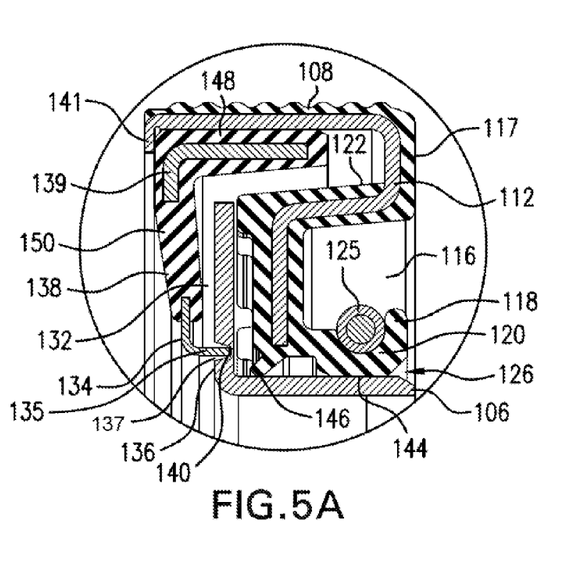
FIG. 5A is an enlarged view of the worn radial shaft seal from FIG. 5.

FIGS. 5 and 5A show radial shaft seal after the elastomer lips and the labyrinth seal have worn from cutting/abrasion against sleeve 106. Groove 137 is formed from cutting edge 140 of sealing ring 134 on sleeve 106 with the cutting edge positioned in groove 137. Primary sealing lip 124 and secondary dust lip 130 have worn against sleeve 106 forming flat surfaces 144 and 146, respectively.

Figure 6:
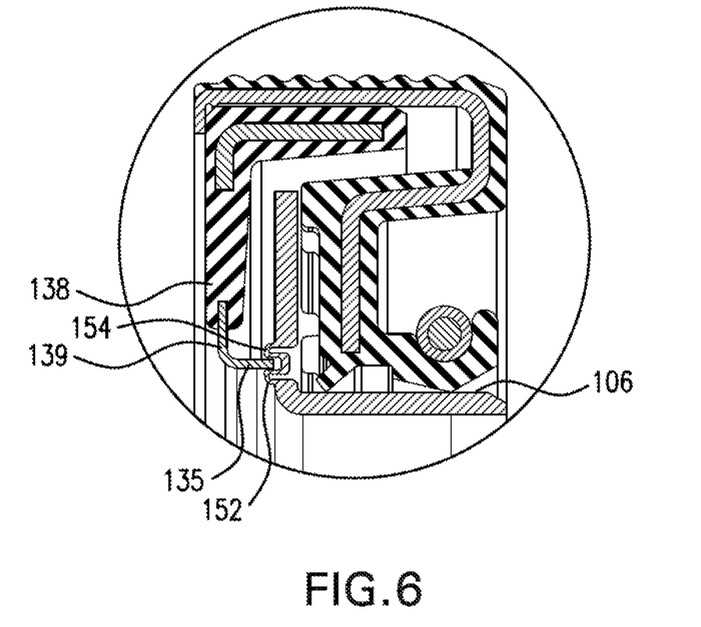
FIG. 6 is a cross-section of a pre-formed labyrinth seal found in an alternative embodiment of a radial shaft seal.

In one embodiment, sleeve 106 is rotatable with the radial shaft, and the sealing surface is stationary. Other configurations in other applications are possible, of course, for example, the sleeve may be stationary and the sealing ring may be rotatable. Alternatively, groove 137 can be pre-formed in sleeve 106. In this embodiment, extending portion 135 of sealing ring 134 extends into groove 137 a sufficient distance to form the labyrinth seal (this embodiment could look similar to the embodiment shown in FIG. 5A where groove 137 is cut or worn). Alternatively, shown in FIG. 6, sleeve 106 can be formed with a first lip 152, and extending portion 135 of sealing ring 134 can be positioned next to first lip 152 forming the labyrinth seal. A second lip 154 can be positioned on the opposite side of extending portion 135 to increase the distance of the labyrinth seal. In this case, since the labyrinth seal is already formed before the seal is used, the extending portion 135 does not need a cutting edge 140, and sealing ring 138 and sleeve 106 can be formed from the same material. Similarly, the sealing ring 134 need not be biased to contact the sleeve 106 in such an embodiment.

Figure 7:
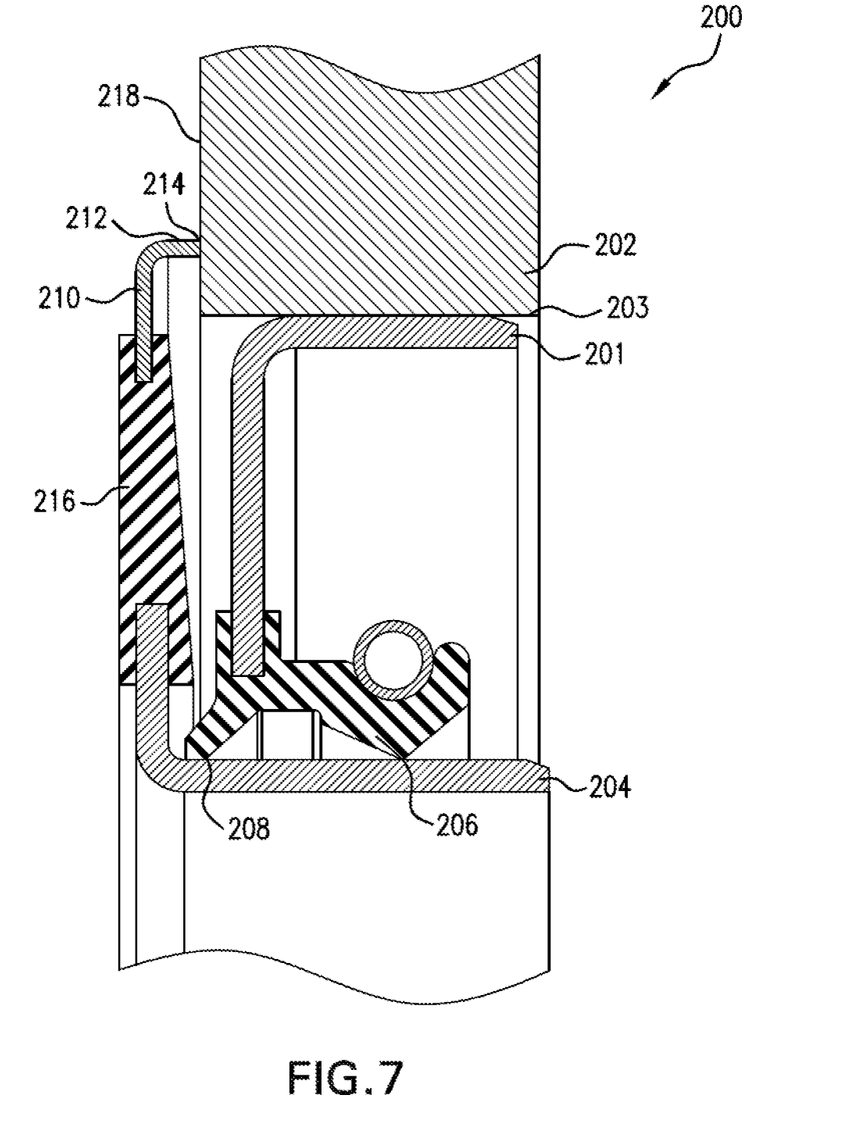
FIG. 7 is a cross-section of an alternative embodiment of a radial shaft seal.

FIG. 7 shows a close up cross-section view of the third sealing surface for an alternative embodiment of a radial shaft seal 200. Radial shaft seal 200 is defined by three primary sealing surfaces. The first sealing surface is a tight static seal formed from an interference fit between an outer diameter of a casing or flange 201 and an inner wall 203 of the bore in a housing 202. The outer diameter of flange 201 of radial shaft seal 200 is slightly larger than inner wall 203 of the bore to ensure a tight press fit that prevents leakage around flange 201, which also keeps radial shaft seal 200 retained in the bore.

The second sealing surface is formed between sleeve 204 and the radial shaft. The second sealing surface is a tight static seal formed from an interference fit between the inner diameter of sleeve 204 and the radial shaft. The inner diameter of sleeve 204 is slightly smaller than the radial shaft to ensure a tight press fit that prevents leakage around sleeve 204. Sleeve 204 then rotates with the radial shaft and with respect to the remaining portions of radial shaft seal 200. Sleeve 106 can also be engaged with the shaft via an adhesive, bonding material or other engaging mechanism.

The third sealing surface is a dynamic sealing surface between one or more elastomeric lips 206 and 208 against sleeve 204 and a labyrinth seal in housing 202. The labyrinth seal is formed by a sealing ring 210 interacting with the housing 202. Sealing ring 210 is connected to sleeve 202 at one end, and at the other end is an extending portion 212 having a cutting edge 214. Sealing ring 210 can be made from hardened steel or any other material suitable for cutting or can be coated with a cutting material, and held in its position by a resilient elastomeric biasing element 216, which urges sealing ring 210 into an outer surface 218 of housing 202. In this regard, sealing ring 210 is pre-loaded against housing 202 when it is initially constructed, as shown in FIG. 7. When the radial shaft and sleeve 204 begin to rotate, the preloaded hardened steel sealing ring 210 begins to cut/wear a groove into housing 202, with the groove generally forming to a size of the cutting edge 214 on extending portion 212 of sealing ring 210, thereby forming a labyrinth seal between the two components. As sealing ring 212 gradually cuts into housing 202, the preload on the cutting edge 214 is gradually diminished, until at a predetermined equilibrium, cutting edge 214 no longer actively cuts into housing 202.

Figure 8:
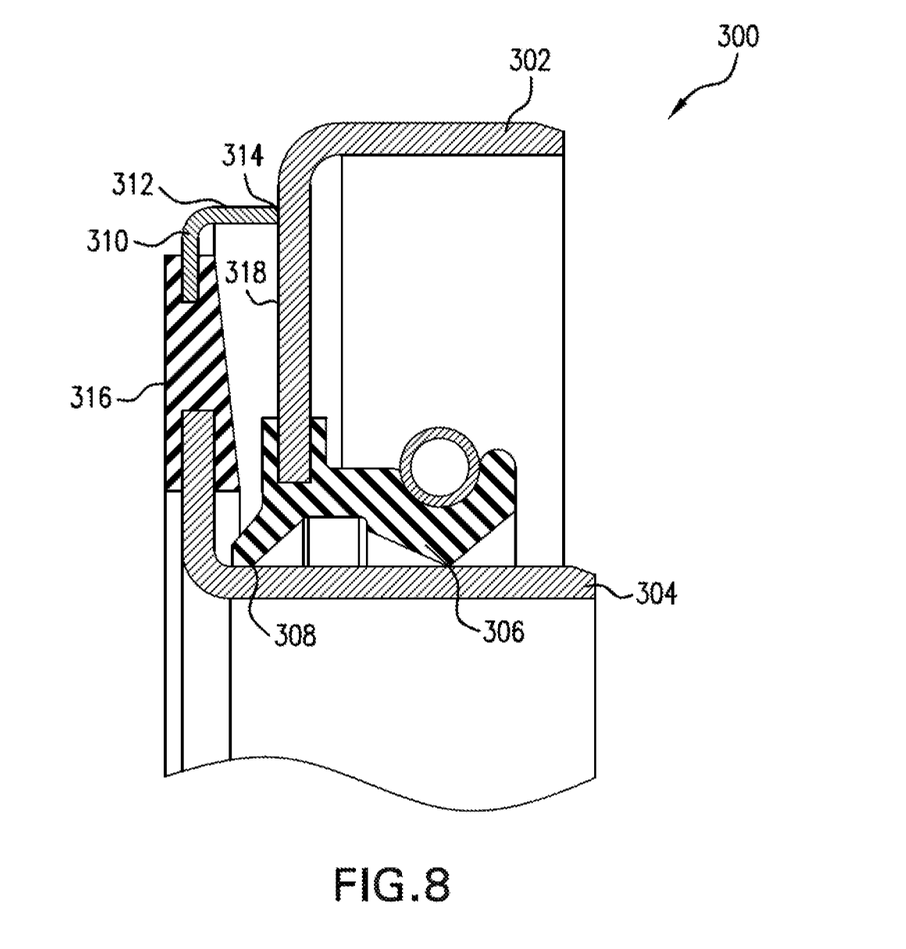
FIG. 8 is a cross-section of yet another alternative embodiment of a radial shaft seal.

FIG. 8 shows a close up cross-section view of the third sealing surface for an alternative embodiment of a radial shaft seal 300. Radial shaft seal 300 is defined by three primary sealing surfaces. The first sealing surface is a tight static seal formed from an interference fit between an outer diameter of a casing or flange 302 and the housing bore. The outer diameter of flange 302 of radial shaft seal 300 is slightly larger than the housing bore to ensure a tight press fit that prevents leakage around flange 302, which also keeps radial shaft seal 300 retained in the bore.

The second sealing surface is formed between sleeve 304 and the radial shaft. The second sealing surface is a tight static seal formed from an interference fit between the inner diameter of sleeve 304 and the radial shaft. The inner diameter of sleeve 304 is slightly smaller than the radial shaft to ensure a tight press fit that prevents leakage around sleeve 304. Sleeve 304 then rotates with the radial shaft and with respect to the remaining portions of radial shaft seal 300.

The third sealing surface is a dynamic sealing surface between one or more elastomeric lips 306 and 308 against sleeve 304 and a labyrinth seal in flange 302. The labyrinth seal is formed by a sealing ring 310 interacting with flange 302. Sealing ring 310 is connected to sleeve 304 at one end, and at the other end is an extending portion 312 having a cutting edge 314. Sealing ring 310 can be made from hardened steel or any other material suitable for cutting or can be coated with a cutting material, and held in its position by a resilient elastomeric biasing element 316, which urges sealing ring 310 into an outer surface 318 of flange 302. In this regard, sealing ring 310 is pre-loaded against flange 302 when it is initially constructed, as shown in FIG. 8. When the radial shaft and sleeve 304 begin to rotate, the preloaded hardened steel sealing ring 310 begins to cut/wear a groove into flange 302, with the groove generally forming to a size of the cutting edge 314 on extending portion 312 of sealing ring 310, thereby forming a labyrinth seal between the two components. As sealing ring 312 gradually cuts into flange 302, the preload on the cutting edge 314 is gradually diminished, until at a predetermined equilibrium, cutting edge 314 no longer actively cuts into flange 302.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting. Various aspects of the different embodiments can be combined in different combinations to create new embodiments within the scope of the invention.

What is claimed is:

1. A method of forming a labyrinth seal in a radial shaft seal that rotates with respect to a housing, the method comprising:
   providing a radial shaft seal, wherein the radial shaft seal comprises a casing having an exterior-facing surface opposite from an interior-facing surface, a sleeve including a first portion that is engageable with a radial shaft and a second portion angled away from the radial shaft and positioned radially inwardly of the casing that rotates with respect to the casing, a sealing ring having a first portion connected to at least one chosen from the casing and the sleeve, and the sealing ring having an extending portion interacting with at least one chosen from the casing, the housing, and the sleeve, wherein the extending portion of the sealing ring comprises a cutting edge integral with the sealing ring having a first hardness, wherein the cutting edge engages a metal surface on the one chosen from the casing, the housing, and the sleeve to form a groove, wherein the metal surface has a second hardness less than the first hardness;
   positioning the radial shaft seal in a bore;
   press-fitting the radial shaft into the sleeve so that the sleeve rotates with the radial shaft;
   rotating the sleeve;
   biasing the extending portion with a preloaded biasing element connected with the first portion and the extending portion of the sealing ring; and
   cutting a groove into at least one chosen from the casing, the housing, and the sleeve with the extending portion as the radial shaft rotates, and thereby forming the labyrinth seal between the exterior-facing surface and the interior-facing surface.

2. The method of claim 1, and further comprising positioning the engaging portion at an equilibrium position where the engaging portion no longer cuts the sleeve.

3. The method of claim 1, wherein the sealing ring is connected to the casing and the extending portion interacts with the sleeve thereby forming the labyrinth seal between the exterior-facing surface and tile interior facing surface.

4. The method of claim 1, wherein the sealing ring is connected to the sleeve and the extending portion interacts with the casing thereby forming the labyrinth seal between the exterior-facing surface and the interior-facing surface.

5. A radial shaft seal for a radial shaft, comprising:
   a casing having an exterior-facing surface opposite from an interior-facing surface;

a sleeve positioned radially inwardly of the casing that is rotatable with respect to the casing;

a sealing ring having a first portion connected to the casing and rotatable with the casing and an extending portion interacting with the sleeve to form a labyrinth seal barrier;

a preloaded biasing element engaged with the first portion and the extending portion of the sealing ring to bias the extending portion into the engagement with the sleeve to form a groove, wherein the sleeve comprises a first portion that is engageable with the radial shaft and a second portion angled away from the radial shaft, wherein the second portion includes a metal surface having a first hardness, wherein the extending portion comprises a cutting edge integral with the sealing ring having a second hardness, wherein the cutting edge engages the metal surface to form the groove, and wherein the first hardness is less than the second hardness.

6. The radial shaft seal of claim 5, wherein the radial shaft seal is engageable to the radial shaft so that the sleeve rotates with the radial shaft.

7. The radial shaft seal of claim 5, wherein the biasing element includes an elastomeric material having a resiliency that urges the extending portion into the sleeve.

8. The radial shaft seal of claim 7, and further comprising a rigid ring combined with the biasing element to provide support for the biasing element.

9. The radial shaft seal of claim 8, wherein the biasing element is an elastomeric ring surrounding the rigid ring and combined with the sealing ring.

10. The radial shaft seal of claim 5, and further comprising: a primary sealing lip surrounding the sleeve and positioned in a path axially separate from the sealing ring to form a barrier to the interior-facing surface; at least one secondary sealing lip surrounding the sleeve and positioned in the path axially in between the sealing ring and the primary sealing lip to form a barrier to the primary sealing lip; and a spring to urge the primary sealing lip into the sleeve.

11. A radial shaft seal for a radial shaft that rotates with respect to a housing, the radial shaft seal comprising:

a casing having an exterior-facing surface opposite from an interior-facing surface;

a sleeve positioned radially inwardly of the casing that is rotatable with respect to the casing; and a sealing ring having a first portion rotatable with the sleeve and an extending portion having a cutting edge interacting with at least one chosen from the casing and the housing to form a labyrinth seal barrier; and a preloaded biasing element connected with the first portion of the sealing ring and the sleeve to bias the cutting edge into engagement with the at least one chosen from the casing or the housing to form a groove.

12. The radial shaft seal of claim 11, wherein the extending portion is biased to engage the casing and to form a groove in the casing as the extending portion rotates with respect to the casing, the extending portion and the groove forming at least a portion of the labyrinth seal barrier.

13. The radial shaft seal of claim 11, wherein the extending portion is biased to engage the housing and to form a groove in the housing as the extending portion rotates with respect to the housing, the extending portion and the housing forming at least a portion of the labyrinth seal barrier.

14. The radial shaft seal of claim 11, wherein the radial shaft seal is engageable to the radial shaft so that the sleeve rotates with the radial shaft.

15. The radial shaft seal of claim 14, wherein the biasing element includes an elastomeric material having a resiliency that urges the extending portion into the sleeve.

16. The radial shaft seal of claim 14, and further comprising a path from the exterior-facing surface to the interior-facing surface, wherein the labyrinth seal is positioned in the path to keep a debris away from the interior-facing surface.

\* \* \* \* \*